US012380049B2

United States Patent
Sherlock et al.

(10) Patent No.: US 12,380,049 B2
(45) Date of Patent: Aug. 5, 2025

(54) CXL FABRIC EXTENSIONS

(71) Applicant: Hewlett Packard Enterprise Development LP, Spring, TX (US)

(72) Inventors: Derek Alan Sherlock, Ft. Collins, CO (US); Joe P. Cowan, Ft. Collins, CO (US); Frank R. Dropps, Annandale, MN (US); Gary B. Gostin, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/511,801

(22) Filed: Nov. 16, 2023

(65) Prior Publication Data

US 2025/0165425 A1 May 22, 2025

(51) Int. Cl.
*G06F 1/3296* (2019.01)
*G06F 13/38* (2006.01)
*G06F 13/40* (2006.01)
*H04L 49/104* (2022.01)

(52) U.S. Cl.
CPC ........ *G06F 13/4027* (2013.01); *G06F 13/387* (2013.01); *H04L 49/106* (2013.01)

(58) Field of Classification Search
CPC ... G06F 13/4027; G06F 13/387; H04L 49/106
See application file for complete search history.

(56) References Cited

U.S. PATENT DOCUMENTS

| | | | | |
|---|---|---|---|---|
| 2020/0327084 A1* | 10/2020 | Choudhary | ......... | G06F 12/0875 |
| 2020/0344329 A1* | 10/2020 | Cannata | ................. | H04L 49/35 |
| 2022/0407740 A1* | 12/2022 | Cox | ................... | H04L 12/4633 |
| 2023/0027178 A1* | 1/2023 | Shah | ................... | G06F 12/1466 |
| 2023/0116820 A1* | 4/2023 | Banerjee | ............... | H04L 47/829 |
| | | | | 709/226 |
| 2023/0325265 A1* | 10/2023 | Balle | ..................... | G06F 9/5072 |
| | | | | 719/328 |
| 2023/0385223 A1* | 11/2023 | Shah | ................... | G06F 13/4221 |

OTHER PUBLICATIONS

"Compute Express Link (CXL) Consortium home page:", available online at <https://www.computeexpresslink.org/>, 2024, 3 pages.
Ahn et al., "HyperX: Topology, Routing, and Packaging of Efficient Large-Scale Networks", Nov. 14-20, 2009, 11 pages.
Keeton et al., "MODC: Resilience for disaggregated memory architectures using task-based programming", 2021, 9 pages.

(Continued)

*Primary Examiner* — Nimesh G Patel
(74) *Attorney, Agent, or Firm* — Yao Legal Services, Inc.

(57) ABSTRACT

One aspect of the instant application can provide a networking device. The networking device can include a set of Compute Express Link (CXL) ports, a set of non-CXL ports, a set of bridge circuits associated with the set of CXL ports, and an interconnect. A respective bridge circuit can include a packet-conversion subcircuit to convert a CXL packet received at a corresponding CXL port to a customized packet and a protocol-conversion subcircuit to convert a CXL protocol to a customized protocol implemented by the networking device. The interconnect can switch customized packets among the CXL and non-CXL ports based on the customized protocol.

20 Claims, 7 Drawing Sheets

(56) References Cited

OTHER PUBLICATIONS

Paul Teich, "HPE Powers up the Machine Architecture", available online at <https://www.nextplatform.com/2017/01/09/hpe-powers-machine-architecture/>, Jan. 9, 2017, 21 pages.

Steven Burke, "Antonio Neri: HPE Memory-Driven Computing Is A Big Data 'Deluge' Game-Changer", available online at <https://www.crn.com/news/data-center/antonio-neri-hpe-memory-driven-computing-is-a-big-data-deluge-game-changer>, Jan. 18, 2019, 10 pages.

* cited by examiner

CXL FABRIC EXTENSIONS

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

Field

This disclosure is generally related to Compute Express Link (CXL®, registered trademark of the CXL Consortium) technologies. More specifically, this disclosure is related to extending the capability of conventional CXL switch fabrics.

BRIEF DESCRIPTION OF THE FIGURES

In the figures, like reference numerals refer to the same figure elements.

DETAILED DESCRIPTION

Compute Express Link (CXL) is a high-speed, open standard interconnect technology designed to accelerate and enhance the performance of data-intensive workloads in various computing environments. CXL builds upon the foundation of Peripheral Component Interconnect (PCI) Express (PCIe) and extends its capabilities to meet the growing demands of modern data-centric applications. CXL is expected to become the ubiquitous interconnect for accelerators, fabric-attached memories, caching devices, etc.

Current CXL technologies can provide certain but limited switching capabilities. In one example, pools of CXL-compliant devices (e.g., memory devices, accelerators, network interface cards (NICs), etc.) attached to a CXL switch can be dynamically assigned to different CXL hosts (which are coupled to the same CXL switch) as private resources. In another example, multiple hosts can have direct load/store access to Multiple Logical Device (MLD) memory attached to the CXL switch. CXL also allows hosts and accelerators to coherently access each other's memory. Although the current CXL standards can support fabric topology, CXL still lacks certain key capabilities useful to large systems, such as systems used for machine learning or high-performance computing (HPC) applications.

Additional features provided by current CXL standards also include port-based routing (PBR), shared Logical Device (LD)-Fabric Attached memory (FAM), Global-FAM, Unordered I/O (UIO) routing, etc. However, these features may still not be sufficient for building a large coherent and memory semantic system that can meet the demand of machine learning and HPC applications. According to some aspects, instead of a CXL switch, standard CXL-compliant components can be combined with a more sophisticated interconnect to provide a large CXL-based fabric solution. More specifically, the more sophisticated interconnect can include one or more interconnected hybrid switch elements (or hybrid switches). The edge ports of the hybrid switch element can include standard CXL ports for the attachment of CXL-compliant components (e.g., hosts, switches, devices, etc.). Note that a "CXL-compliant device" can refer to a networking device (e.g., a memory device, an accelerator, or a NIC) implemented according to the CXL standards or specifications, meaning that these devices support the aforementioned CXL features. A CXL-compliant device can also be referred to as a CXL-enabled device, a CXL-aware device, or simply a CXL device. These terms may be used interchangeably throughout this disclosure. In addition to the CXL ports, the hybrid switch element can also include non-CXL ports used for establishing more sophisticated inter-switch couplings. For example, a hybrid switch element (or hybrid switch for short) can be coupled to other hybrid switches via its non-CXL ports. The non-CXL ports can be customized ports depending on the design of the underlying switch fabric.

Figure 1:
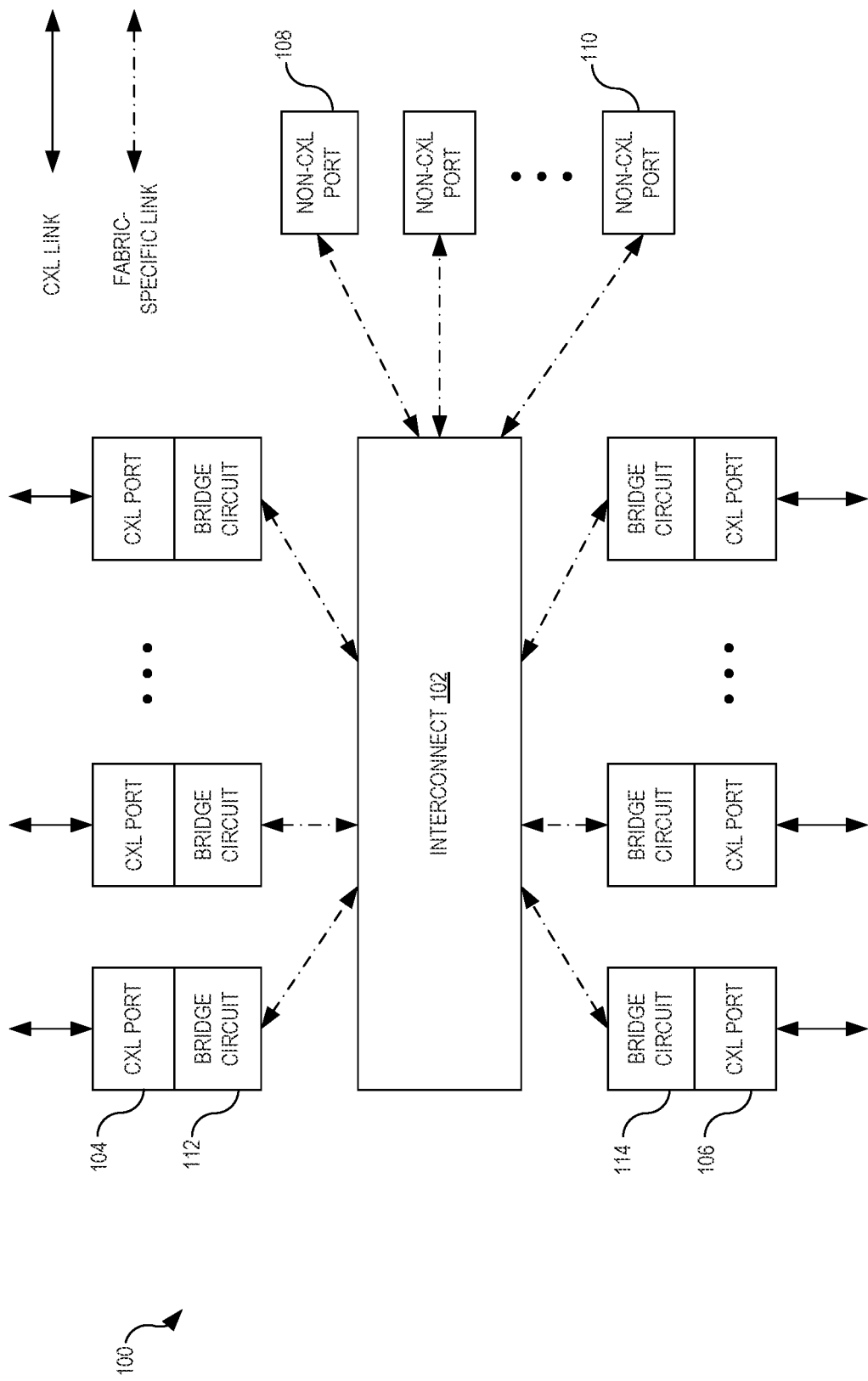
FIG. 1 illustrates an example hybrid switch element, according to one aspect of the instant application.

FIG. 1 illustrates an example hybrid switch, according to one aspect of the instant application. In FIG. 1, a hybrid switch element 100 can include an interconnect 102, a number of CXL ports (e.g., ports 104 and 106), and a number of non-CXL ports (e.g., ports 108 and 110). The non-CXL ports can be directly coupled to interconnect 102, whereas each CXL port can be coupled to interconnect 102 via a bridge circuit. For example, CXL port 104 is coupled to interconnect 102 via bridge circuit 112, and CXL port 106 can be coupled to interconnect 102 via bridge circuit 114.

According to some aspects, interconnect 102 can include a customized switch that has been specifically designed to support and optimize the communication between various devices and servers in a data center or storage area network (SAN). Compared with a standard CXL switch with limited switching capabilities, a customized switch can reduce latency and improve stability. A customized switch can also provide additional network features beyond those provided by standard CXL switches. Depending on the implementation, different types of customized switches can be used as interconnect 102 within hybrid switch element 100. According to some aspects of the instant application, interconnect 102 can include subsystems for performing various networking functions that can improve the performance of the entire system. These subsystems can include but are not limited to a multipath-routing subsystem, a load-balancing subsystem, and a congestion-management subsystem.

According to some aspects, interconnect 102 can receive and transmit packets having a format that is specific to the customized switch included in interconnect 102. The term "packet" is used here independent of whether it is segmented or aggregated when processed internally or transmitted over a link. CXL and some other network protocols may use the term "message" instead. Throughout this disclosure, the terms "packet" and "message" may be used interchangeably.

Interconnect 102 can perform switching operations on the packets or messages. In one example, interconnect 102 can parse the header fields of a packet to make a switching or routing decision such that the packet can be routed from one port to another. For example, a packet can be routed from one CXL port to another CXL port, from one CXL port to a non-CXL port, or from one non-CXL port to another non-CXL port. There is no limitation in the combinations of the source and destination ports of a packet.

As discussed previously, the CXL ports are the edge ports used to couple to CXL-compliant components. Accordingly, the communication links coupled to CXL ports are CXL links (indicated using solid double arrows) for transporting CXL packets (e.g., packets with header fields defined by the CXL specifications). For example, a CXL packet header can include many fields such as a start of packet (SOP) field, a packet type field, a packet length (Leg) field, a packet sequence number field, a tag field, a device identifier (ID) field, a vendor-defined field, a flow control field, a request ID field, an atomic operation attribute field, an address field, a data parity field, etc. A CXL switch would be able to perform switching or routing operations on a received CXL packet based on information included in the CXL packet header.

However, the customized switch in interconnect 102 typically is not a CXL switch and cannot process the CXL packet header. Moreover, the customized switch can have its own switching rules (e.g., rules based on a customized protocol) which may be different from the CXL switching rules (e.g., rules based on the CXL protocol). Therefore, the customized switch cannot switch the CXL traffic directly. The CXL traffic should be converted to traffic that can be switched by the customized switch. In this disclosure, traffic that can be recognized and switched by the customized switch can be referred to as customized switch-specific traffic (or customized traffic for short). Similarly, packets with a header that can be recognized by the customized switch can be referred to as customized-switch-specific packets (or customized packets for short). Depending on the implementation, the header format of a customized-switch-specific packet or customized packet can vary. The scope of this disclosure is not limited by the format of the customized-switch-specific packet. According to some aspects, a bridge circuit positioned between a CXL port and interconnect 102 can facilitate the conversion between the CXL traffic and the customized-switch-specific traffic.

In one example, bridge circuit 112 can convert a CXL packet received at CXL port 104 to a customized-switch-specific packet, which can arrive at interconnect 102 via a fabric specific link (indicated using a dashed double arrow). Bridge circuit 112 can also include provide a function to ensure the end-to-end reliability. Interconnect 102 can forward the customized-switch-specific packet to bridge circuit 114, which can convert to customized-switch-specific packet to a CXL packet to be transmitted by CXL port 106. In another example, interconnect 102 can forward the customized-switch-specific packet received from bridge circuit 112 to non-CXL port 108, which can then transmit the customized-switch-specific packet to a different interconnect coupled to interconnect 102.

Figure 2:
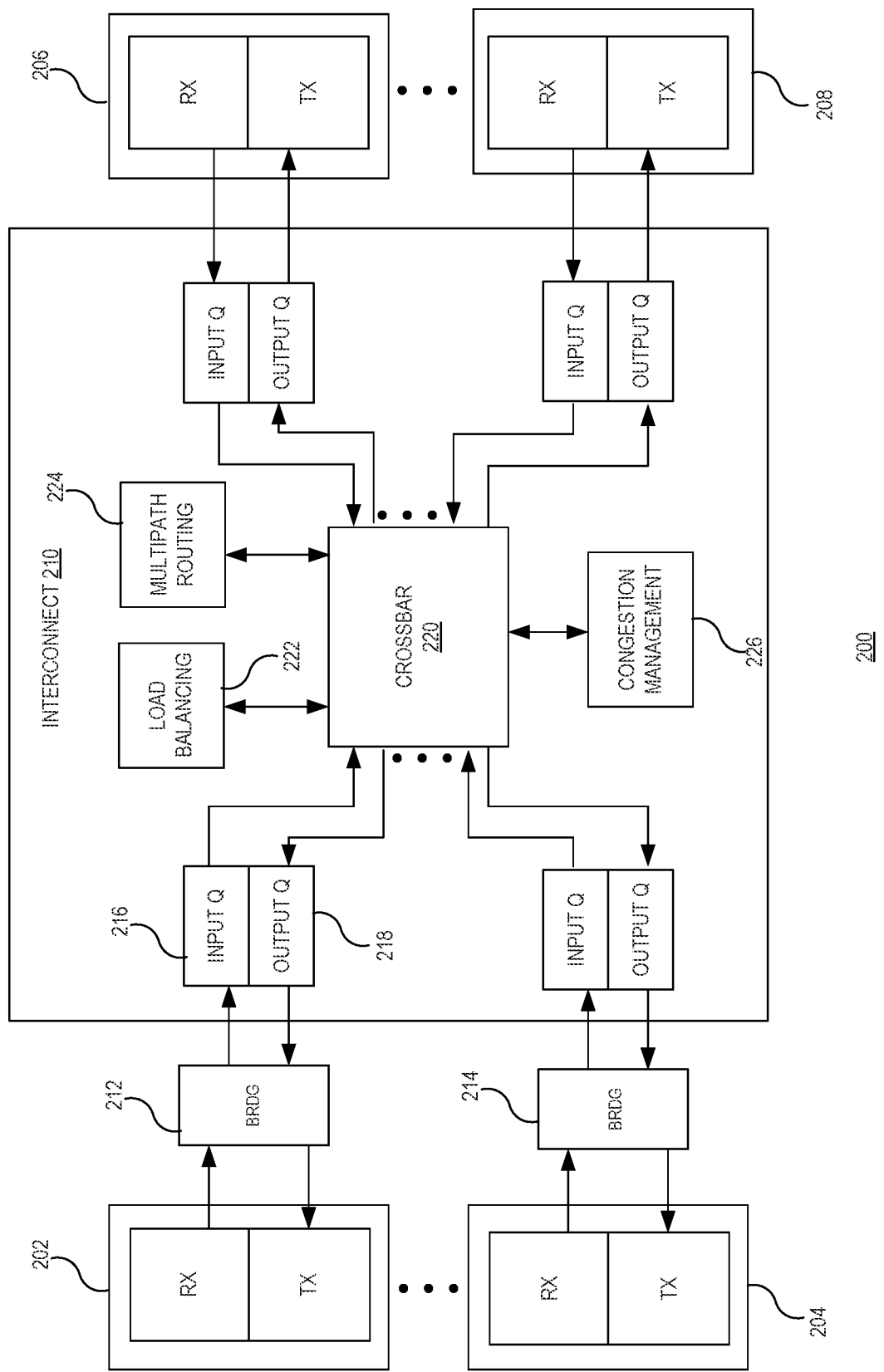
FIG. 2 illustrates in more detail an example hybrid switch element, according to one aspect of the instant application.

According to some aspects, CXL or non-CXL port can be bi-directional, meaning that it includes both a transmitter and a receiver. FIG. 2 illustrates in more detail an example hybrid switch, according to one aspect of the instant application. In FIG. 2, a hybrid switch element 200 can include a number of CXL ports (e.g., ports 202 and 204), a number of non-CXL ports (e.g., ports 206 and 208), an interconnect 210, and a number of bridge circuits (e.g., BRDG 212 and 214). Each CXL or non-CXL port can include a transmitter (TX) and a receiver (RX). A CXL port can be coupled to interconnect 210 via a corresponding bridge (BRDG) circuit.

FIG. 2 also shows that interconnect 210 can include a number of input queues (e.g., input queue 216) for queuing received packets and output queues (e.g., output queue 218) for queuing to-be-transmitted packets. Note that the receiver of a non-CXL port can be coupled directly to an input queue, and similarly the transmitter of the non-CXL port can be coupled directly to an output queue. However, the receiver and transmitter of a CXL queue should be coupled to the corresponding input and output queues in interconnect 210 via a bridge circuit. For example, the receiver of CXL port 202 is coupled to input queue 216 via bridge circuit 212, and the transmitter of CXL port 202 is coupled to output queue 218 via bridge circuit 212.

Interconnect 210 can include a crossbar 220. Packets dequeued from the input queues can be switched to output queues by crossbar 220. According to some aspects of the instant application, crossbar 220 can switch a packet from the input queue of any port to the output queue of any port. For example, crossbar 220 can switch a packet dequeued from input queue 216 to any output queue. According to some aspects, crossbar 220 can include one or more chips (e.g., ASIC chips), which can be configured to switch or route packets among the CXL and non-CXL ports of interconnect 210.

Note that FIG. 2 is a high-level logical abstraction of the logic structure of hybrid switch element 200. The actual implementation of hybrid switch element 200 can be much more complex than what is shown in FIG. 2. For example, although shown as a single entity, each input or output queue can include multiple queues, such as queues for different traffic classes. Moreover, the input or output data requests can be placed in the queues, whereas the data packets can be placed in input and output buffers. When a request is dequeued, the corresponding packet or packets can be retrieved from the buffers. Similarly, crossbar 220 may include a request crossbar for switching requests and a data crossbar for switching data packets.

Interconnect 210 can also include circuits or subsystems for performing various operations that can enhance the capabilities of hybrid switch element 200. Interconnect 210 can include a subsystem 222 for performing load balancing across multiple data paths and a subsystem 224 for performing enhanced multipath routing. Conventional CXL multipath routing does not apply to all traffic types, whereas the multipath-routing subsystem 224 can extend the multipath-ing capability of conventional CXL systems to include all CXL traffic, such as all CXL message classes. The enhanced multipath routing can facilitate the end-to-end reliability mechanism to work for all CXL message classes.

Interconnect 210 can include a subsystem 226 for performing congestion management. According to some aspects, the congestion-management subsystem 226 can apply a novel flow-channel-based congestion-control mechanism to prevent local congestion from spreading within the switch fabric. More specifically, the flow-channel-based congestion-control mechanism can identify congested flows as congestion sources or congestion victims and limit the routing of the congestion sources to prevent the spread of the congestion. This flow-channel-based congestion control capability can be enabled by the identification and management of flow channels. Each switch in the network (e.g., interconnect 210) can set up a flow channel by assigning a particular flow ID to packets belonging to the same flow. Each switch can assign every flow a dedicated queue, thus allowing the switch to monitor and manage the level of congestion and individual flows. When the congestion-management subsystem 226 identifies a flow channel as a source of the congestion, it can make appropriate routing decisions to prevent the spreading of the congestion. For example, new packets in the flow channel may be forced to take the congested path or to buffer in an edge port. On the other hand, when the congestion-management subsystem 226 identifies a flow channel as a victim of the congestion, it will route the flow through the fabric normally.

As can be seen in FIGS. 1 and 2, bridge circuits can play an important role in the hybrid switch element. More specifically, they can allow unmodified standard CXL components (e.g., off-the-shelf CXL memory devices or NICs) to work with a switch fabric comprised of customized fabric switches. The customized fabric switch can provide more sophisticated switching of CXL traffic. The underlying switch fabric (e.g., protocol, topology, routing, etc.) can be hidden from the CXL components. From the perspective of the CXL components, they are working with a standard CXL switch and do not need to modify their behaviors. In addition to converting a CXL packet to a packet recognizable by the customized fabric switch (i.e., a customized-switch-specific packet) through encapsulation, a bridge circuit can also include subcircuits or subsystems that can provide end-to-end reliability and translate/map the CXL switching rules and policies to rules and policies supported by the underlying customized switch fabric.

Figure 3:
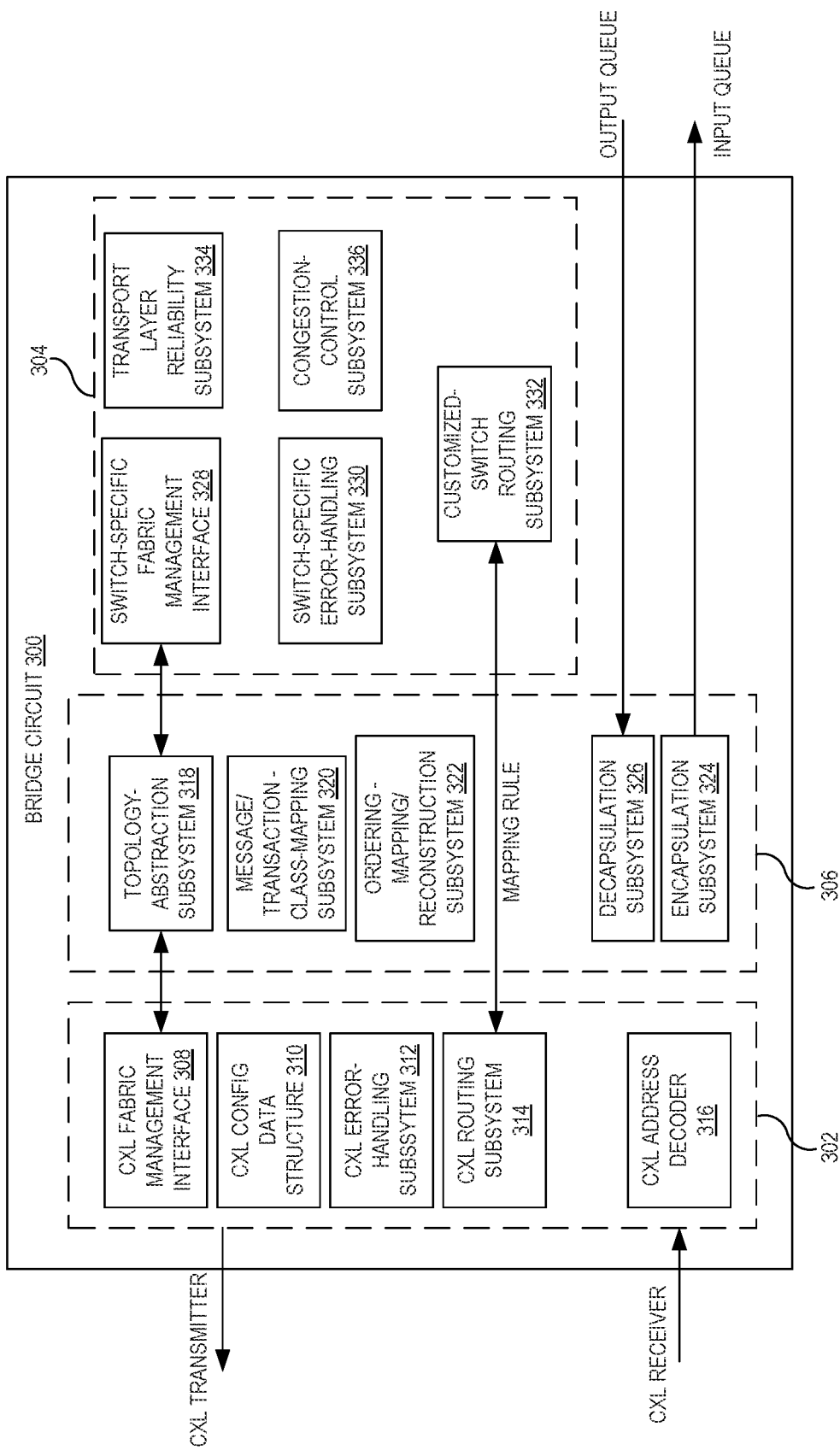
FIG. 3 illustrates an example block diagram of a bridge circuit, according to one aspect of the instant application.

FIG. 3 illustrates an example block diagram of a bridge circuit, according to one aspect of the instant application. Bridge circuit 300 can include three groups of subcircuits or subsystems, including a CXL group 302, a customized-switch group 304, and a bridging group 306.

CXL group 302 can include a number of subcircuits or subsystems for performing CXL-specific functionalities, such as processing or routing CXL packets. According to some aspects, CXL group 302 can include a CXL fabric management interface 308, a CXL configuration data structure 310, a CXL error-handling subsystem 312, a CXL routing subsystem 314, and a CXL address decoder 316. CXL fabric management interface 308 can provide an interface between bridge circuit 300 and the CXL fabric management system (not shown in FIG. 3) that is responsible for setting up and managing the connections in the switch fabric according to CXL standards. CXL configuration data structure 310 can be used to define network settings in the context of CXL for the hybrid switch. CXL error-handling subsystem 312 can perform error detection and reporting according to CXL standards. CXL routing subsystem 314 can route CXL packets based on the packet header and the CXL ordering rules. CXL address decoder 316 can include Host-managed Device Memory (HDM) decoders for routing packets based on HPA addresses to provide fan-out and interleaving functionality. The CXL packets received at or to be transmitted from a CXL port coupled to bridge circuit 300 can be processed via the various subcircuits/subsystems in CXL group 302 such that the CXL device transmitting or receiving those packets can behave the same way as if it is coupled to a standard CXL switch.

Customized-switch group 304 can include a number of subcircuits or subsystems for performing functionalities that are specific to the underlying customized switch fabric, such as processing or routing the customized-switch-specific packets. Depending on the implementation, customized-switch group 304 can also include a number of subsystems/subcircuits for traffic shaping. In the example shown in FIG. 3, customized-switch group 304 can include a switch-specific fabric management interface 328, a switch-specific error-handling subsystem 330, a customized-switch routing subsystem 332, a transport layer reliability subsystem 334, and a congestion-control subsystem 336.

Switch-specific fabric management interface 328 can provide an interface between bridge circuit 300 and the fabric management system (not shown in FIG. 3) specific to the customized switch fabric. Switch-specific error-handling subsystem 330 can be responsible for handling errors in the underlying customized switch fabric according to protocols specific to the customized switch fabric. Customized-switch routing subsystem 332 can be responsible for routing the customized-switch-specific packets based on the customized packet header and the routing rules specific to the underlying customized switch fabric.

Transport layer reliability subsystem 334 can interact with a corresponding transport layer reliability subsystem located on another bridge circuit via end-to-end messages routed across the fabric to ensure the end-to-end reliability of the transport of packets (e.g., by adding a transport layer). Because the multipath-routing has been extended multipathing to all traffic types, transport layer reliability subsystem 334 can also work for all traffic types, including all CXL message classes. End-to-end reliability can provide system resiliency in the event of link or component failure, thus enabling large systems to continue uninterrupted operation after failures and during subsequent repairs.

Congestion-control subsystem 336 can interact with a corresponding congestion-management subsystem (e.g., subsystem 226 shown in FIG. 2) to manage congestion in the underlying switch fabric. According to some aspects, a flow-channel-based congestion-management scheme can be employed. The congestion-management scheme can prevent local congestion from propagating through the network.

Bridging group 306 can include subcircuits/subsystems that can facilitate the conversion between the CXL protocol and the protocol implemented by the customized switch fabric. In the example shown in FIG. 3, bridging group 306 can include a topology-abstraction subsystem 318, a message/transaction-class-mapping subsystem 320, an ordering-mapping/reconstruction subsystem 322, an encapsulation subsystem 324, and a decapsulation subsystem 326.

Topology-abstraction subsystem 318 can interact with both CXL fabric management interface 308 and switch-specific fabric management interface 328. According to some aspects, topology-abstraction subsystem 318 can convert the abstract of the topology of the underlying switch fabric to a CXL topology and provide such a topology to CXL fabric management interface 308.

Message/transaction-class-mapping subsystem 320 can be responsible for mapping CXL message/transaction classes to traffic classes supported by the underlying customized switch fabric. For example, CXL defines different types of memory transactions, such as transactions from Master to Subordinate (M2S) and transactions from Subordinate to Master (S2M). The M2S transactions can include three message classes: request without data or Request (Req); request with Data (RwD), and Back-Invalidation Response (BIRsp). The S2M transactions can include three message classes, such as response without data or No Data Response (NDR), response with data or Data Response (DRS), and Back-Invalidation Snoop (BISnp).

In general, the number of message classes supported by the CXL protocols can be much larger than the number of traffic classes supported by the underlying customized switch fabric. Moreover, CXL standards specify a number of ordering rules among transactions/messages (e.g., the execution order of transactions targeting the same address). The CXL ordering rules can ensure forward process while enforcing the producer-consumer model. For example, a memory write should not bypass a prior memory write transaction, because the prior write may be data and the latter one may set the Flag indicating that the prior write is completed. The Flag bypassing the data can result in reading of stale data. In another example, completions must be able to bypass prior non-posted messages since a non-posted message generates a completion, meaning that completions being stuck behind a memory read can deadlock the system. Therefore, mapping the CXL message/transaction classes to the traffic classes of the customized switch fabric should also take into consideration the CXL ordering rules. Ordering-mapping/reconstruction subsystem 322 can be responsible for mapping or reconstructing the CXL ordering rules into traffic routing behaviors of the underlying customized switch fabric.

Encapsulation subsystem 324 can encapsulate a CXL message with header fields specific to the customized switch fabric to convert the CXL message to a customized packet. More specifically, the communication protocol implemented by the customized switch can define those customized header fields, including the content and format of each field. The encapsulated packet can then be sent to the customized interconnect in the hybrid switch for switching. On the other hand, a customized packet may be outputted by the customized interconnect to bridge circuit 300, and decapsulation subsystem 326 can remove the header fields specific to the customized switch fabric to convert it back to a CXL packet. The CXL packet can then be transmitted by the CXL transmitter to a coupled CXL device.

Figure 4:
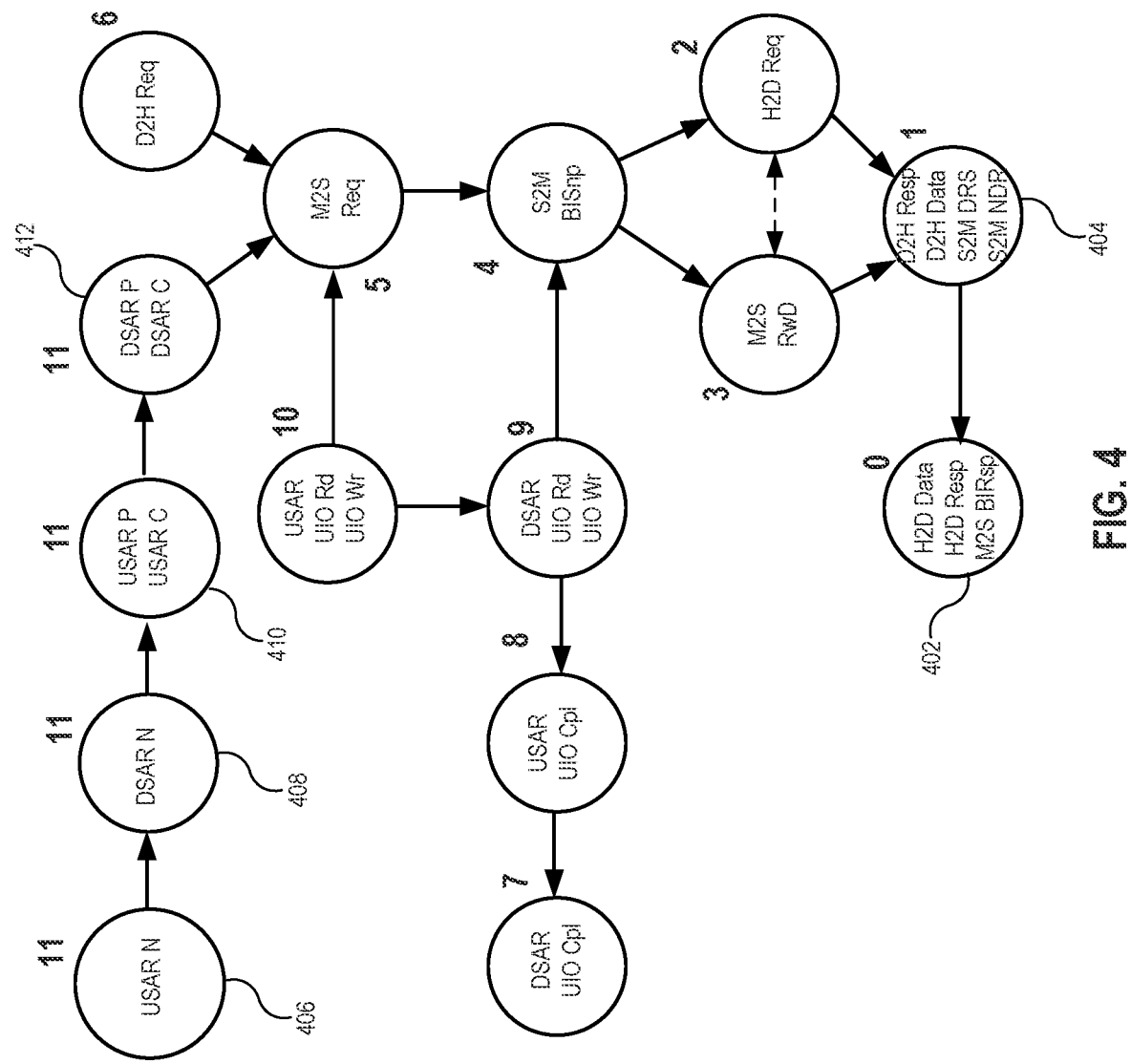
FIG. 4 illustrates an example mapping between CXL message/transaction classes and traffic classes supported by the underlying customized switch fabric, according to one aspect of the instant application.

FIG. 4 illustrates an example mapping between CXL message/transaction classes and traffic classes supported by the underlying customized switch fabric, according to one aspect of the instant application. In the example shown in FIG. 4, the customized switch fabric can support up to 12 traffic classes (e.g., traffic class 0 through traffic class 11). In FIG. 4, each traffic class can be represented by one or more nodes. For example, node 402 represents traffic class 0, node 404 represents traffic class 1, and nodes 406-412 represent traffic class 11. The CXL protocols may define many more classes, meaning that multiple CXL classes may be mapped to one traffic class. According to some aspects, mutually compatible message classes can be grouped together and mapped to a single traffic class. Note that message classes are considered mutually compatible if they are permitted to block each other when transported across the fabric (i.e., no harm is done by the blocking actions). In the example shown in FIG. 4, each node can be filled with one or more CXL message classes mapped to that node. For example, node 402 is filled with three CXL message classes (e.g., host-to-device (H2D) Data, H2D Response (Resp), and M2S BIRsp), meaning that these three CXL message classes can be mapped to traffic class 0. FIG. 4 also shows that node 404 is filled with four other CXL message classes (e.g., D2H Resp, D2H Data, S2M DRS, and S2M NDR) that are mapped to traffic class 1. When the bridge circuit receives a CXL message from a CXL port, the bridge circuit can first determine the message class associated with the received CXL message and then determine, according to the mapping shown in FIG. 4, the corresponding traffic class of the received message. The traffic class can be included in the encapsulation header of the CXL message.

In the example shown in FIG. 4, the arrows between the nodes can indicate the dependency relationships between the corresponding traffic classes based on the CXL ordering rules associated with the message classes mapped to each traffic class. For example, the arrow pointed from node 404 (which represents traffic class 1) to node 402 (which represents traffic class 0) can indicate that transactions of traffic class 1 can depend on the transactions of traffic class 0 (meaning that blocking transactions in traffic class 0 can result in transactions in traffic class 1 being blocked as well, but not vice versa).

Due to the limited number of traffic classes supported by the customized switch fabric, in certain scenarios, multiple inter-dependent CXL message classes may be mapped to the same traffic class. In the example shown in FIG. 4, traffic class 11 can be represented by four nodes corresponding to four inter-dependent subclasses, with each subclass including one or more CXL message classes. For example, node 406 includes the USAR N (upstream acceptance rules non-posted) message class can depend on node 408 that includes the DSAR N (downstream acceptance rules non-posted) message class. Node 408 can depend on node 410 that includes both the USAR P (upstream acceptance rules posted) and the USAR C (upstream acceptance rules completion) message classes, and node 410 can depend on node 412 that includes the DSAR P and DSAR C (downstream acceptance rules posted and completion) message classes. Various mechanisms can be used to maintain the independence between the multiple subclasses, including but not limited to pre-allocation and end-to-end crediting.

Note that the underlying customized switch fabric may not inherently support ordered routing. According to some aspects, various mechanisms can be used to map the CXL ordering rules to dependency relationships among the traffic classes of the customized switch fabric, such that the underlying switch fabric can route the encapsulated CXL packets according to the CXL ordering rules. In one example, re-order buffers (ROBs) can be used to enforce the ordering rules based on packet sequence numbers. In another example, selective techniques using content-addressable memory (CAM) and set-aside buffers can be used to enforce the address-dependent ordering rules. Other types of implementations are also possible. The scope of this disclosure is not limited by the actual techniques used to map the CXL ordering rules to the packet switching orders in the underlying customized switch fabric.

Figure 5:
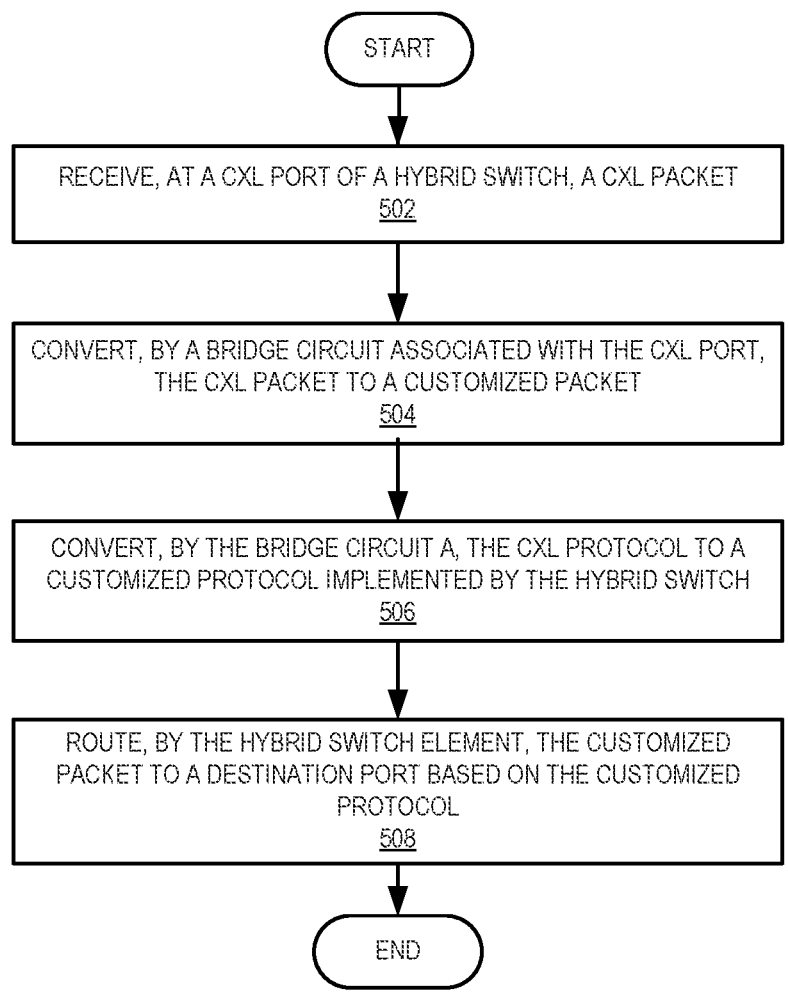
FIG. 5 presents a flowchart illustrating an example packet-switching process, according to one aspect of the instant application.

FIG. 5 presents a flowchart illustrating an example packet-switching process, according to one aspect of the instant application. During operation, the hybrid switch can receive, at a CXL port, a CXL packet (operation 502). The hybrid switch can include a plurality of CXL ports and a plurality of non-CXL ports. The CXL ports can be used to couple to CXL-compliant components, such as hosts, memory devices, accelerators, etc. The non-CXL ports can be used to couple to other hybrid switches. The hybrid switch can include a customized interconnect that can provide a number of enhanced switching/routing capabilities beyond those provided by a standard CXL switch. A number of interconnected hybrid switches can form a customized switch fabric to provide connectivity among a large number of CXL-compliant hosts and devices.

A bridge circuit associated with the CXL port can convert the CXL packet to a customized packet (operation 504). According to some aspects, the CXL packet can be encapsulated with header fields that are specific to the customized switch fabric. The bridge circuit can also convert the CXL protocol to a customized protocol implemented by the hybrid switch (operation 506). According to some aspects, converting the CXL protocol to the customized protocol can include mapping the CXL message class associated with the packet to a corresponding traffic class supported or defined by the customized protocol. More specifically, the bridge circuit can store the mapping relationship between the CXL message classes and the traffic classes supported by the customized protocol. The mapping relationship can be similar to the one shown in FIG. 4, in which one or more CXL message classes can be mapped to a traffic class. Upon receiving, from the CXL port, a CXL packet or message, the bridge circuit can first determine the CXL message class associated with the received packet and then determine, based on the stored mapping relationship, a traffic class. The determined traffic class can be included in the encapsulated header fields. In addition to mapping the CXL message class to a traffic class, one or more CXL ordering rules associated with the CXL message class can be converted or mapped to the dependency relationships among the traffic classes of the customized protocol. The dependency relationships among the traffic classes can be similar to the arrows shown in FIG. 4.

The hybrid switch can subsequently switch the customized packet to a destination port based on the customized protocol (operation 508). The conversion of the CXL protocol to the customized protocol can ensure that the switching operation performed by the customized switch can be similar to a CXL switch (i.e., it follows the CXL switching rules and ordering). In one example, the hybrid switch can use ROBs to enforce the CXL ordering rules based on packet sequence numbers. In another example, the hybrid switch can use CAM and set-aside buffers to enforce address-dependent ordering rules. The destination port can be a CXL port or a non-CXL port. If the destination port is a non-CXL port coupled to a different hybrid switch, the customized packet can be directly forwarded from the non-CXL port to the different hybrid switch. If the destination port is a CXL port coupled to a CXL-compliant component, the customized packet can be converted by a bridge circuit associated with the destination port back to the original CXL packet and then forwarded to a CXL-compliant component coupled to the destination port.

In a different example, a non-CXL port on the hybrid switch may receive a customized packet. Accordingly, the hybrid switch can perform a switching operation on the received packet directly, without conversion. If the destination port is a non-CXL port, the switched packet can be directly forwarded to a coupled hybrid switch. If the destination port is a CXL port, the switched packet can be converted back to a CXL packet before being sent to a coupled CXL-compliant component.

Converting the CXL protocol to a protocol specific to the underlying customized switch fabric can be performed by various subcircuits/subsystems on the bridge circuit. In one example, the number of CXL message classes is much larger than the number of traffic classes supported by the customized protocol, and multiple mutually independent CXL message classes may be mapped to the same traffic class. In an alternative example, inter-dependent CXL message classes may be mapped to different subclasses of a traffic class. In one example, the CXL ordering rules can be converted to sequence-number-based packet orders in re-order or set-aside buffers. In alternative examples, various flow-control mechanisms (e.g., pre-allocation or end-to-end crediting) can also be used by the underlying customized switch fabric to enforce the CXL ordering rules.

Figure 6:
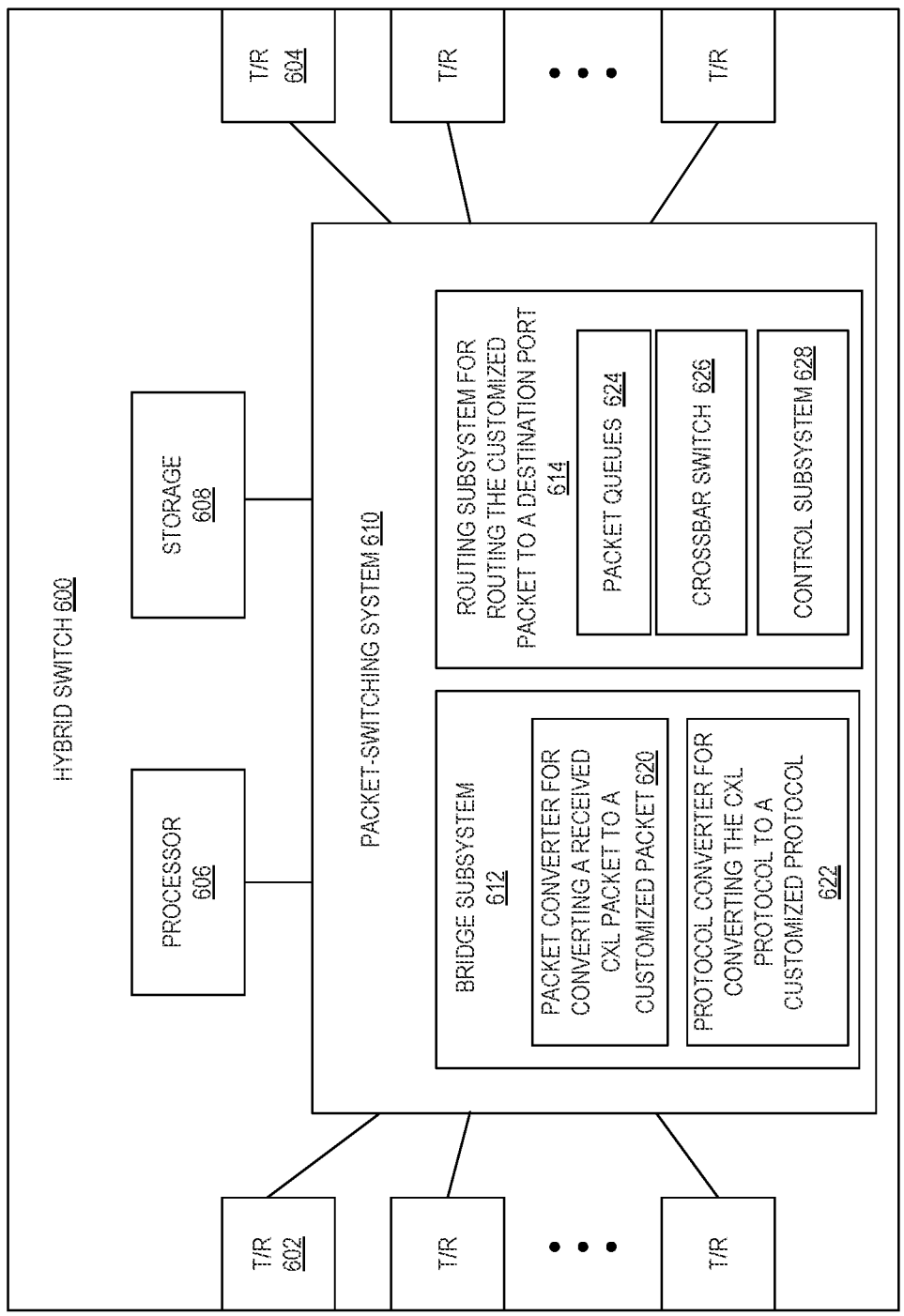
FIG. 6 illustrates an example of the hardware architecture of a hybrid switch, according to one aspect of the instant application.

FIG. 6 illustrates an example of the hardware architecture of a hybrid switch, according to one aspect of the instant application. In FIG. 6, a hybrid switch 600 can include a number of communication ports, such as ports 602 and 604. The communication ports can include CXL ports and non-CXL ports (which are not separately labeled in FIG. 6). Each port can include a transmitter and a receiver. The CXL ports can be coupled to CXL-compliant hosts and devices and can receive and send CXL packets. The non-CXL ports can be coupled to other hybrid switches and can receive and send customized-switch-specific packets.

Hybrid switch 600 can also include a processor 606, a storage device 608, and a packet-switching system 610. Packet-switching system 610 can be coupled to all the communication ports and can include a bridge subsystem 612.

Bridge subsystem 612 can include a packet converter 620 for converting a received CXL packet to a customized packet and a protocol converter 622 for converting the CXL protocol to a customized protocol implemented by the hybrid switch. For example, packet converter 620 can convert a CXL packet received at a CXL port of hybrid switch 600 to a customized-switch-specific packet such that the converted packet can be switched by the underlying customized interconnect to a destination port. Moreover, packet converter 620 can also convert a customized-switch-specific packet that has been switched by hybrid switch 600 back to a CXL packet such that the CXL packet can be sent to a CXL-compliant component coupled to hybrid switch 600. Protocol converter 622 can map the CXL message class associated with the received CXL packet to a traffic class supported by the underlying customized switch fabric. Due to the mismatch between the number of CXL classes and the number of traffic classes supported by the customized switch fabric, the mapping can be a multiple-to-one mapping, where multiple mutually independent CXL classes can be mapped to the same traffic class. More specifically, CXL implements ordered packet switching, whereas the customized switch fabric may not implement ordered switching. Accordingly, protocol converter 622 can implement various mechanisms (e.g., applying packet sequence numbers, reorder buffers, end-to-end crediting, etc.) to allow the underlying customized switch fabric to maintain the CXL switching order.

Packet-switching system 610 can also include a routing subsystem 614 for routing the customized packet to a destination port based on the customized protocol. Routing subsystem 614 can include packet queues 624, crossbar switch 626, and a control subsystem 628. Packet queues 624 can include input and output queues associated with the communication ports. Crossbar switch 626 can include one or more chips and can switch a packet from the input queue of any port to the output queue of any port. Control subsystem 628 can also include a number of subsystems or subcircuits that can provide various enhanced features that are beyond the switching capabilities of standard CXL switching fabrics. For example, the enhanced features can include flow-channel-based load balancing and congestion management, multipath routing for all traffic types, and ensuing end-to-end reliability by adding a transport layer.

Figure 7:
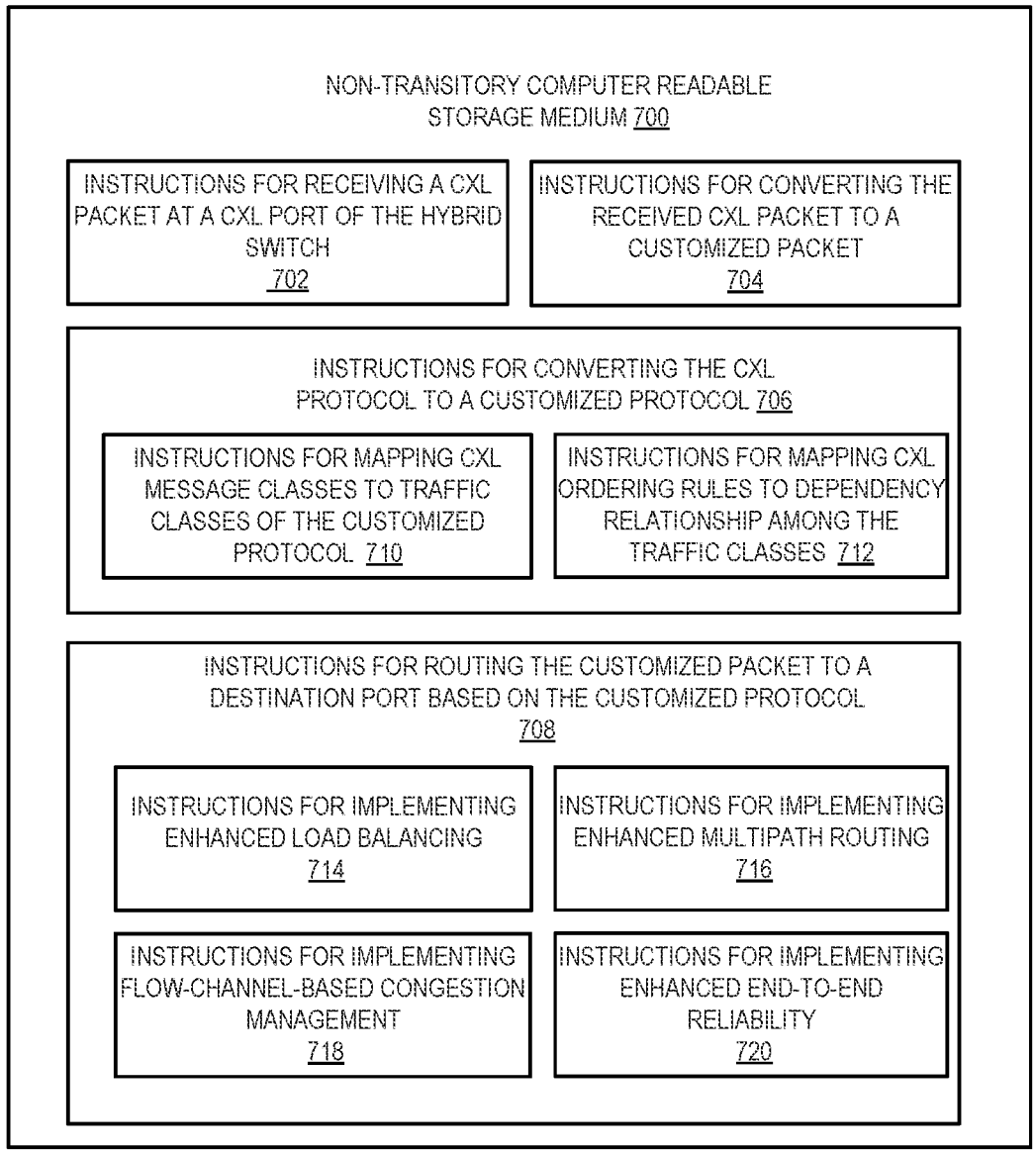
FIG. 7 illustrates an example of a non-transitory computer-readable medium, according to one aspect of the instant application.

FIG. 7 illustrates an example of a non-transitory computer-readable medium, according to one aspect of the instant application. Non-transitory computer-readable medium 700 can store executable instructions for switching CXL packets across a customized switch fabric comprising a hybrid switch. Non-transitory computer-readable medium 700 can store instructions 702 for receiving a CXL packet at a CXL port of the hybrid switch, instructions 704 for converting the received CXL packet to a customized packet, instructions 706 for converting the CXL protocol to a customized protocol implemented by the hybrid switch, and instructions 708 for routing the customized packet to a destination port based on the customized protocol. More specifically, protocol-conversion instructions 706 can include instructions 710 for mapping CXL message classes to traffic classes of the customized protocol and instructions 712 for mapping CXL ordering rules to dependency relationships among the traffic classes. Instructions 708 can include instructions 714 for implementing enhanced load balancing, instructions 716 for implementing enhanced multipath routing, instructions 718 for implementing flow-channel-based congestion management, and instructions 720 for implementing enhanced end-to-end reliability.

Non-transitory machine-readable storage medium 700 may be implemented in a single device or distributed across devices. Non-transitory machine-readable storage medium 700 may be any electronic, magnetic, optical, or other physical storage apparatus to contain or store information such as executable instructions, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof.

In general, the disclosure describes a system and method that extends features of existing CXL standards and improves the scalability of CXL switches. Instead of an off-the-shelf CXL switch, CXL-compliant hosts and devices can be interconnected by a hybrid switch that includes both CXL ports and non-CXL ports. The CXL ports can be used for coupling to CXL-compliant hosts and devices, and the non-CXL ports can be used for coupling to other hybrid switches. The interconnected hybrid switches can form a complex customized switch fabric. Each CXL port on the hybrid switch can include a bridge circuit to allow CXL packets to be encapsulated as packets that can be transported over the customized switch fabric. This solution allows the formation of a large interconnected CXL-based computer system (e.g., an HPC system) using standard CXL components. Compared with conventional CXL switches, the proposed interconnect with hybrid switches can be scalable and can provide many advanced routing features, such as enhanced load balancing, congestion control, multipath routing, and end-to-end reliability.

One aspect of the instant application can provide a networking device. The networking device can include a set of Compute Express Link (CXL) ports, a set of non-CXL ports, a set of bridge circuits associated with the set of CXL ports, and an interconnect. A respective bridge circuit can include a packet-conversion subcircuit to convert a CXL packet received at a corresponding CXL port to a customized packet and a protocol-conversion subcircuit to convert a CXL protocol to a customized protocol implemented by the networking device. The interconnect can switch customized packets among the CXL and non-CXL ports based on the customized protocol.

In a variation on this aspect, the packet-conversion subcircuit is to convert a switched customized packet to a CXL packet to be transmitted by a corresponding CXL port. For example, a standard CXL packet can be converted to a packet recognizable by the networking device such that the networking device can perform a corresponding packet switching operation on the converted packet.

In a variation on this aspect, the packet-conversion subcircuit is to encapsulate the CXL packet with one or more header fields defined by the customized protocol. For example, encapsulation subsystem 324 shown in FIG. 3 can encapsulate CXL packets with the customized header fields to allow CXL packets to tunnel through the customized switch fabric.

In a variation on this aspect, the protocol-conversion subcircuit is to map one or more CXL message classes associated with the CXL packet to a traffic class defined by the customized protocol. For example, message/transaction-class-mapping subsystem 320 can map one or more CXL message classes to a traffic class defined by the customized protocol based on the example shown in FIG. 4.

In a further variation, the protocol-conversion subcircuit is to map CXL ordering rules to dependency relationships among traffic classes defined by the customized protocol. For example, ordering-mapping/reconstruction subsystem 322 can map the CXL ordering rules to the dependency relationships among the traffic classes shown in FIG. 4.

In a variation on this aspect, the interconnect can further include one or more of: a load-balancing subcircuit; a multipath-routing subcircuit; a congestion-management subcircuit; or an end-to-end-reliability subcircuit. In the example shown in FIG. 2, interconnect 210 includes load-balancing subcircuit 222, multipath-routing subcircuit 224, and congestion-management subcircuit 226.

In a variation on this aspect, the interconnect can include a crossbar switch. In the example shown in FIG. 2, interconnect 210 includes crossbar switch 220.

In a variation on this aspect, the CXL ports can be coupled to standard CXL-compliant components comprising one or more of: a CXL host; a CXL memory device; or a CXL accelerator. In the example shown in FIG. 1, CXL port 104 can be coupled to a host, and CXL port 106 can be coupled to a CXL-compliant memory device.

In a variation on this aspect, the non-CXL ports can be coupled to non-CXL ports of other networking devices to form a customized switch fabric. In the example shown in FIGS. 1, non-CXL ports 108 and 110 can be coupled to non-CXL ports of different hybrid switches.

One aspect of the instant application can provide a method for switching CXL packets across a customized switch fabric. The method can include receiving, at a Compute Express Link (CXL) port of a networking device comprising a plurality of CXL ports and a plurality of non-CXL ports, a CXL packet; converting, by the networking device, the received CXL packet to a customized packet; converting, by the networking device, a CXL protocol to a customized protocol implemented by the networking device; and switching, by the networking device, the customized packet to a destination port based on the customized protocol.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

The above description is presented to enable any person skilled in art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be any electronic, magnetic, optical, or other physical storage apparatus to contain or store information such as executable instructions, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer-readable storage medium described herein may be non-transitory.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A networking device, comprising:
 a set of Compute Express Link (CXL) ports;
 a set of non-CXL ports;
 a set of bridge circuits associated with the set of CXL ports, a respective bridge circuit comprising a packet-conversion subcircuit to convert a CXL packet received at a corresponding CXL port to a customized packet and a protocol-conversion subcircuit to convert a CXL protocol to a customized protocol implemented by the networking device by mapping one or more CXL message classes associated with the CXL packet to a traffic class defined by the customized protocol and mapping CXL ordering rules that specify execution orders of CXL messages to dependency relationships among traffic classes defined by the customized protocol; and
 an interconnect to switch customized packets among the CXL and non-CXL ports based on the customized protocol.

2. The networking device of claim 1, wherein the packet-conversion subcircuit is to convert a switched customized packet to a CXL packet to be transmitted by a corresponding CXL port.

3. The networking device of claim 1, wherein the packet-conversion subcircuit is to encapsulate the CXL packet with one or more header fields defined by the customized protocol.

4. The networking device of claim 1, wherein the interconnect further comprises one or more of:
 a load-balancing subcircuit;
 a multipath-routing subcircuit; or
 a congestion-management subcircuit.

5. The networking device of claim 1, wherein the interconnect comprises a crossbar switch.

6. The networking device of claim 1, wherein the CXL ports are coupled to standard CXL-compliant components comprising one or more of:
 a CXL host;
 a CXL memory device; or
 a CXL accelerator.

7. The networking device of claim 1, wherein the non-CXL ports are coupled to non-CXL ports of other networking devices to form a customized switch fabric.

8. A method comprising:
 receiving, at a Compute Express Link (CXL) port of a networking device comprising a plurality of CXL ports and a plurality of non-CXL ports, a CXL packet;
 converting, by the networking device, the received CXL packet to a customized packet;
 converting, by the networking device, a CXL protocol to a customized protocol implemented by the networking device by mapping one or more CXL message classes associated with the CXL packet to a traffic class defined by the customized protocol and mapping CXL ordering rules that specify execution orders of CXL messages to dependency relationships among traffic classes defined by the customized protocol; and
 switching, by the networking device, the customized packet to a destination port based on the customized protocol.

9. The method of claim 8, further comprising:
 in response to the destination port being a CXL port, converting the customized packet back to the CXL packet; and
 transmitting the CXL packet to a CXL-compliant component coupled to the destination port.

10. The method of claim 8, further comprising:
 in response to the destination port being a non-CXL port, transmitting the customized packet to a second networking device coupled to the destination port.

11. The method of claim 8, wherein converting the CXL packet to a customized packet comprises encapsulating the CXL packet with one or more header fields defined by the customized protocol.

12. The method of claim 8, wherein switching the customized packet comprises one or more of:
performing enhanced load-balancing;
applying multipath-routing to all traffic arriving at the networking device;
performing flow-channel-based congestion management operations; or
implementing an additional transport layer to ensure end-to-end-reliability.

13. The method of claim 8, wherein switching the customized packet comprises applying a crossbar switch.

14. The method of claim 8, wherein the CXL packet is received from:
a CXL host;
a CXL memory device; or
a CXL accelerator.

15. A non-transitory computer-readable storage medium storing instructions that when executed by a processor cause the processor to perform a method, the method comprising:
receiving, at a Compute Express Link (CXL) port of a networking device comprising a plurality of CXL ports and a plurality of non-CXL ports, a CXL packet;
converting, by the networking device, the received CXL packet to a customized packet;
converting, by the networking device, a CXL protocol to a customized protocol implemented by the networking device by mapping one or more CXL message classes associated with the CXL packet to a traffic class defined by the customized protocol and mapping CXL ordering rules that specify execution orders of CXL messages to dependency relationships among traffic classes defined by the customized protocol; and
switching, by the networking device, the customized packet to a destination port based on the customized protocol.

16. The non-transitory computer-readable storage medium 15, wherein the method further comprises:
in response to the destination port being a CXL port, converting the customized packet back to the CXL packet and transmitting the CXL packet to a CXL-compliant component coupled to the destination port; and
in response to the destination port being a non-CXL port, transmitting the customized packet to a second networking device coupled to the destination port.

17. The non-transitory computer-readable storage medium 15, wherein converting the CXL packet to a customized packet comprises encapsulating the CXL packet with one or more header fields defined by the customized protocol.

18. The non-transitory computer-readable storage medium 15, wherein switching the customized packet comprises one or more of:
performing enhanced load-balancing;
applying multipath-routing to all traffic arriving at the networking device;
performing flow-channel-based congestion management operations; or
implementing an additional transport layer to ensure end-to-end-reliability.

19. The non-transitory computer-readable storage medium 15, wherein switching the customized packet comprises applying a crossbar switch.

20. The non-transitory computer-readable storage medium 15, wherein the CXL packet is received from:
a CXL host;
a CXL memory device; or
a CXL accelerator.

* * * * *